US011935448B2

(12) United States Patent
Chapman, Jr.

(10) Patent No.: US 11,935,448 B2
(45) Date of Patent: Mar. 19, 2024

(54) PERFORMING SYSTEM UPDATES ON AN APPLIANCE HAVING A LIMITED USER INTERFACE

(71) Applicant: Haier US Appliance Solutions, Inc., Wilmington, DE (US)

(72) Inventor: John Gilman Chapman, Jr., Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 16 days.

(21) Appl. No.: 17/669,466

(22) Filed: Feb. 11, 2022

(65) Prior Publication Data

US 2023/0260440 A1    Aug. 17, 2023

(51) Int. Cl.
*G09G 3/14* (2006.01)
*F24C 7/08* (2006.01)
*G06F 8/65* (2018.01)
*G09F 9/302* (2006.01)
*G09F 9/33* (2006.01)

(52) U.S. Cl.
CPC ............... *G09G 3/14* (2013.01); *F24C 7/08* (2013.01); *G06F 8/65* (2013.01); *G09F 9/3023* (2013.01); *G09F 9/33* (2013.01)

(58) Field of Classification Search
CPC ..... G09G 3/14; F24C 7/08; G06F 8/65; G09F 9/3023; G09F 9/33
USPC .................................................. 717/120–178
See application file for complete search history.

(56) References Cited

U.S. PATENT DOCUMENTS

| 8,112,538 | B2 | 2/2012 | Lee et al. | |
| 9,800,430 | B2* | 10/2017 | Ha | H04L 12/2825 |
| 10,333,731 | B2* | 6/2019 | Ebrom | H04L 12/2816 |
| 10,608,835 | B2 | 3/2020 | Ha | |
| 10,633,778 | B2* | 4/2020 | Park | D06F 34/24 |
| 2007/0169090 | A1* | 7/2007 | Kang | G06F 8/65 |
| | | | | 717/168 |

(Continued)

FOREIGN PATENT DOCUMENTS

JP       2006126503 A    5/2006
WO    WO2020107689 A1    6/2020

OTHER PUBLICATIONS

Jabbar, Waheb A., et al. "Design and fabrication of smart home with internet of things enabled automation system." IEEE access 7 (2019): pp. 1-16. (Year: 2019).*

(Continued)

*Primary Examiner* — Satish Rampuria
(74) *Attorney, Agent, or Firm* — Dority & Manning, P.A.

(57) ABSTRACT

A home appliance includes a cabinet, a user interface provided on the cabinet, the user interface comprising one or more light emitting diodes and at least one input button, a wireless communication module configured to receive wireless transmissions, and a controller provided within the cabinet. The controller is configured for receiving a request for a system update via the wireless communication module, displaying a predetermined sequence on the user interface via the one or more light emitting diodes indicating that the request for the system update is available, receiving a confirmation via a user input to the user interface to initiate the system update, and instructing the wireless communication module to obtain the system update.

20 Claims, 4 Drawing Sheets

(56) References Cited

U.S. PATENT DOCUMENTS

| | | | | |
|---|---|---|---|---|
| 2012/0110747 | A1* | 5/2012 | Yum | A47L 15/0063 |
| | | | | 68/12.23 |
| 2014/0129654 | A1* | 5/2014 | Karaoguz | H04L 67/10 |
| | | | | 709/204 |
| 2018/0006758 | A1* | 1/2018 | Filson | H04K 3/22 |
| 2018/0198638 | A1* | 7/2018 | Ha | H04L 12/12 |
| 2020/0012488 | A1 | 1/2020 | Koval et al. | |

OTHER PUBLICATIONS

Ramlee, Ridza A., et al. "Smart home system using android application." 2013 International Conference of Information and Communication Technology (ICoICT). IEEE, 2013.pp. 277-280 (Year: 2013).*

Elshafee, Ahmed, and Karim Alaa Hamed. "Design and implementation of a WIFI based home automation system." International Journal of Computer and Information Engineering 6.8 (2012): pp. 1074-1080. (Year: 2012).*

Potts, Josh, and Somsak Sukittanon. "Exploiting Bluetooth on Android mobile devices for home security application." 2012 Proceedings of IEEE Southeastcon. IEEE, 2012.pp. 1-4 (Year: 2012).*

Rifon, LE Anido, et al. "Improving the quality of life of dependent and disabled people through home automation and tele-assistance." 2013 8th International Conference on Computer Science & Education. IEEE, 2013.pp. 478-483 (Year: 2013).*

Sharma, Mukul, and Subhash Chand Gupta. "An internet of things based smart surveillance and monitoring system using Arduino." 2018 International Conference on Advances in Computing and Communication Engineering (ICACCE). IEEE, 2018.pp. 428-433 (Year: 2018).*

* cited by examiner

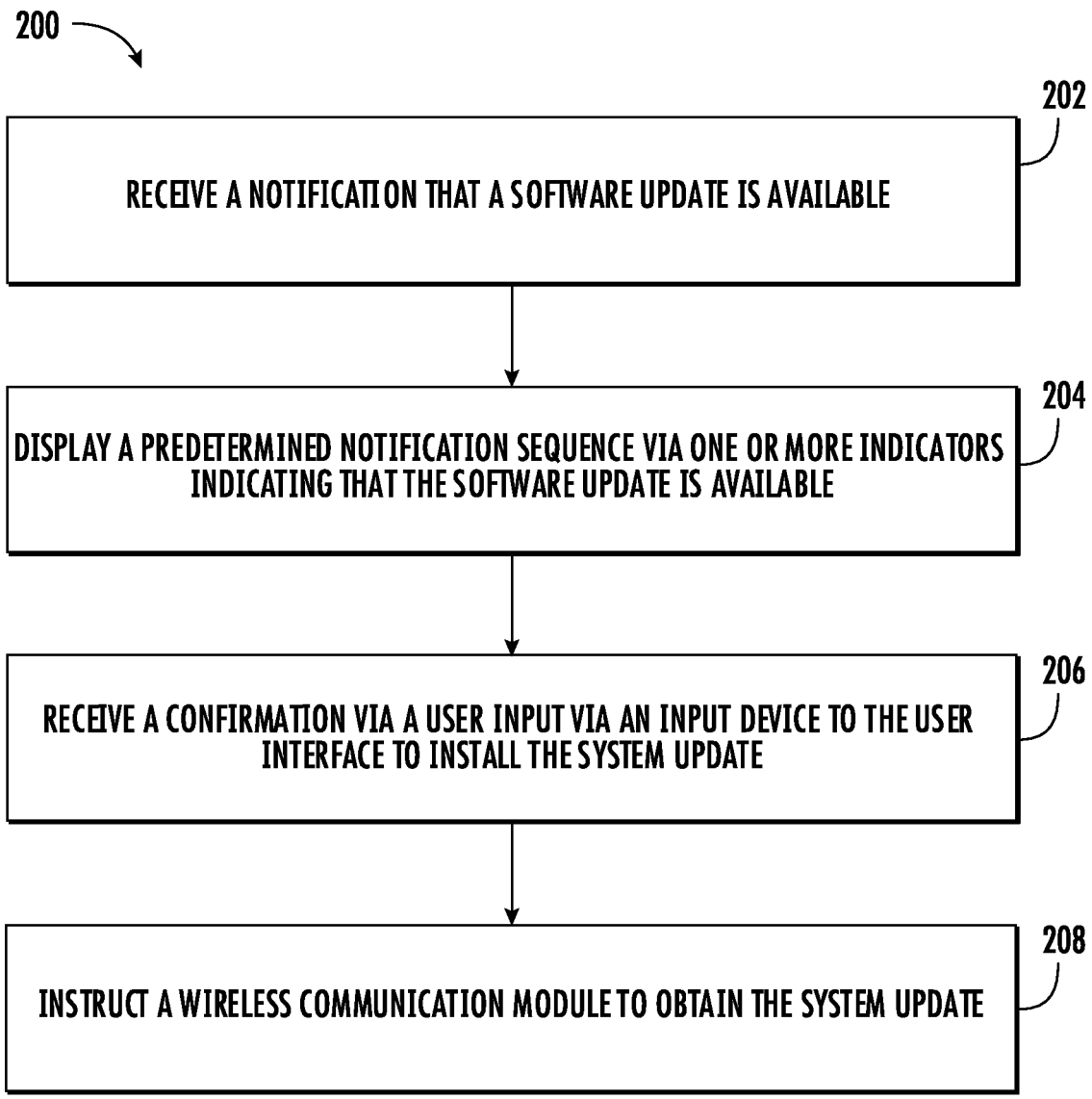

PERFORMING SYSTEM UPDATES ON AN APPLIANCE HAVING A LIMITED USER INTERFACE

FIELD OF THE INVENTION

The present subject matter relates generally to home appliances, and more particularly to performing updates on home appliances having limited user interfaces.

BACKGROUND OF THE INVENTION

Traditional home appliances typically include a user interface having a display capable of displaying certain information to users of the home appliance. In many cases, these displays are simplistic in nature, for instance including a plurality of seven segment displays, e.g., commonly used to display numbers only. Certain information therefore cannot be displayed, such as graphical representations, complex sentences, and the like. Moreover, some user interfaces of home appliances include simple light emitting diodes (LEDs) to indicate operational statuses, options selected, or the like.

Moreover, many home appliances include features that allow for updates such as software updates to be uploaded thereto. Users may be notified of pending or available updates via the user interface, typically indicated by the display. However, many notifications, instructions on implementing updates, and other update-related information are difficult to display on traditional simple displays. In addition, users may find it difficult to implement the updates via a limited user interface, such as a user interface including only a few input buttons.

Accordingly, a home appliance that obviates one or more of the above-mentioned drawbacks would be beneficial. In particular, a method of operating a home appliance to notify users of updates would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a home appliance is provided. The home appliance may include a cabinet; a user interface provided on the cabinet, the user interface including one or more indicators and at least one input device; a wireless communication module configured to receive wireless transmissions; and a controller provided within the cabinet. The controller may be configured for receiving a notification that a software update is available via the wireless communication module; displaying a predetermined notification sequence via the one or more indicators indicating that the software update is available; receiving a confirmation via a user input to the at least one input device to install the software update; and instructing the wireless communication module to obtain the software update.

In another exemplary aspect of the present disclosure, a method of operating a home appliance is provided. The home appliance may include a cabinet, a user interface provided on the cabinet, the user interface including one or more indicators and at least one input device, and a wireless communication module configured to receive wireless transmissions. The method may include receiving a notification that a software update is available via the wireless communication module; displaying a predetermined notification sequence via the one or more indicators indicating that the software update is available; receiving a confirmation via a user input to the input device to install the software update; and instructing the wireless communication module to obtain the software update.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 6 provides a flow chart illustrating a method of operating a home appliance according to exemplary embodiments of the present disclosure.

Figure 1:
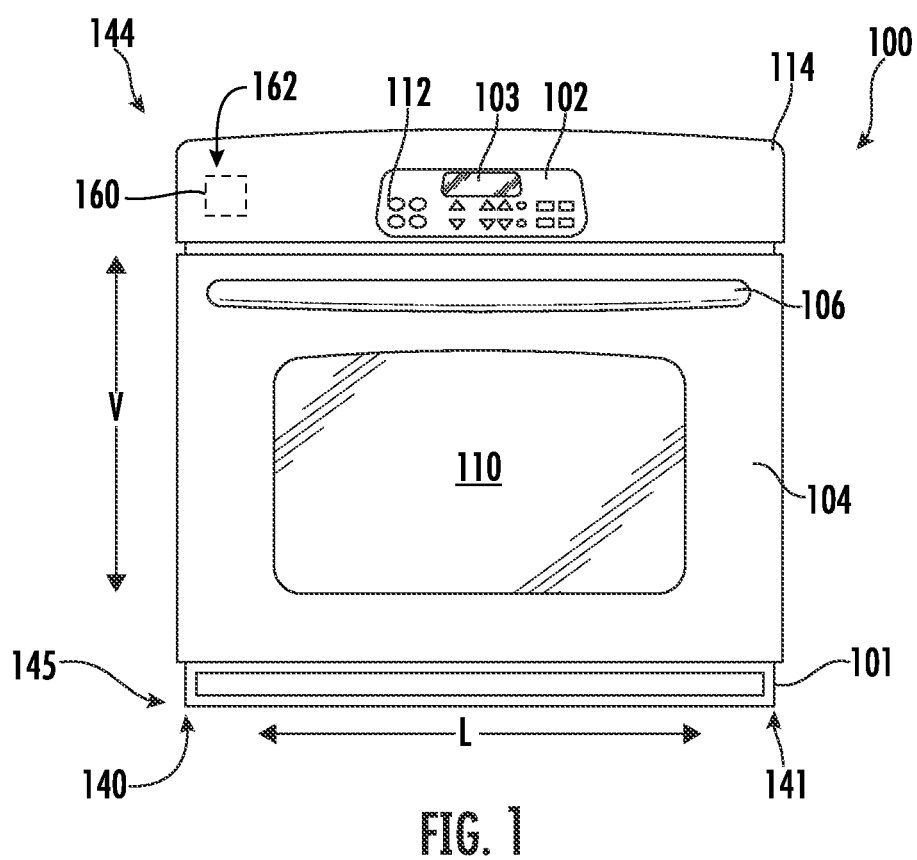
FIG. 1 provides a front view of an oven appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure relates to appliances, such as home appliances, that include low technology, limited displays. For instance, the displays or interfaces associated with the appliances herein are capable of simple displays only able to portray limited information. In some cases, the displays described herein are restricted to one or more indicators such as lights (e.g., light emitting diodes). Furthermore, it should be understood that the embodiments described herein are exemplary, and the disclosure may be applied to any suitable appliance. With reference to FIG. 1, an oven appliance is provided by way of example. Similarly, with reference to FIG. 5, a laundry treatment appliance is provided by way of example. However, the disclosure may apply to additional appliances, such as refrigerators, microwaves, air conditioners, dishwashers, and the like.

Referring now to FIG. 1, an exemplary embodiment of an oven appliance 100 is shown. The oven appliance 100 includes a cabinet or housing 101 with a cooking chamber 116 positioned therein. The cabinet 101 extends between a first side 140 and a second side 141 along a lateral direction L. Further, the cabinet 101 also extends between a front and a back along a transverse direction T. The cabinet 101 further extends between a top 144 and a bottom 145 along a vertical direction V. Transverse direction T is substantially perpendicular to lateral and vertical directions L, V. Thus, vertical direction V, lateral direction L, and transverse direction T are orthogonally oriented such that vertical direction V, lateral direction L, and transverse direction T form an orthogonal directional system.

The oven appliance 100 also includes a door 104 with handle 106 that provides for opening and closing access to a cooking chamber. A user of the oven appliance 100 can place a variety of different items to be cooked in the cooking chamber onto racks. Heating elements may be positioned at the top and the bottom of the cooking chamber to provide heat for cooking and cleaning. Such heating element(s) can be e.g., gas, electric, microwave, or a combination thereof. Other heating elements could be located at other locations as well. A window 110 on door 104 allows the user to view e.g., food items during the cooking process.

Referring to FIG. 1, the oven appliance 100 includes a user interface 102 having a display 103 positioned on top panel 114 with a variety of controls (or input devices) 112. In certain embodiments, the interface 102 allows the user to select various options for the operation of oven appliance 100 including e.g., temperature, time, and/or various cooking and cleaning cycles. Operation of the oven appliance 100 can be regulated by a controller 160 (FIG. 2) that is operatively coupled i.e., in communication with, user interface panel 102, heating element(s), and other components of oven appliance 100.

For example, in response to user manipulation of the user interface panel 102, the controller 160 can operate heating element(s). The controller 160 can receive measurements from a temperature sensor placed in the cooking chamber and e.g., provide a temperature indication to the user with display 103. By way of example, the controller 160 may include a memory and one or more processing devices such as microprocessors, CPUs, or the like, such as general or special purpose microprocessors operable to execute programming instructions or micro-control code associated with operation of appliance 100. The memory may represent random access memory such as DRAM, or read only memory such as ROM or FLASH. In one exemplary embodiment, the processor executes programming instructions stored in memory. The memory may be a separate component from the processor or may be included onboard within the processor.

The controller 160 may be positioned in a variety of locations throughout appliance 100. Thus, the controller 160 may be located under or next to the user interface 102 or otherwise within top panel 114. In an exemplary embodiment, input/output ("I/O") signals are routed between the controller 160 and various operational components of appliance 100 such as heating element(s), controls 112, display 103, sensor(s), alarms, and/or other components as may be provided. In one exemplary embodiment, the user interface panel 102 may represent a general purpose I/O ("GPIO") device or functional block.

Although shown with touch type controls 112, it should be understood that controls 112 and the configuration of the oven appliance 100 shown in FIG. 1 is provided by way of example only. More specifically, user interface 102 may include various input components, such as one or more of a variety of electrical, mechanical, or electro-mechanical input devices including rotary dials, push buttons, and touch pads. The user interface 102 may include other display components, such as a digital or analog display device designed to provide operational feedback to a user. The user interface 102 may be in communication with the controller 160 via one or more signal lines or shared communication busses. Also, the oven appliance 100 is shown as a wall oven but the present invention could also be used with other appliances such as e.g., a stand-alone oven, an oven with a stove-top, and other configurations as well.

Display 103 may be a traditional limited display. For instance, with reference to FIGS. 2 through 4, display 103 may include a plurality of seven-segment displays 170. In detail, seven-segment displays 170 may include seven elongated indicators formed into a rectangular shape. It is hereby noted that seven-segment displays are well known in the art, and as such a detailed description thereof will be foregone for the sake of brevity. For example, display 103 may include four seven-segment displays 170, such that information such as a time of day or temperature of oven appliance 100 may be displayed. Additionally or alternatively, controller 160 may selectively display messages across display 103 (e.g., across the plurality of seven-segment displays 170).

Controller 160 may include a wireless communication module 162 configured to receive wireless transmissions. The wireless transmissions may include over-the-air (OTA) updates from the manufacturer to improve functionality of the appliance, fix bugs, or the like. According to at least some embodiments, wireless communications module 162 may receive notifications that an update (e.g., a software update) is available to be applied to the appliance (e.g., oven appliance 100).

Figure 2:
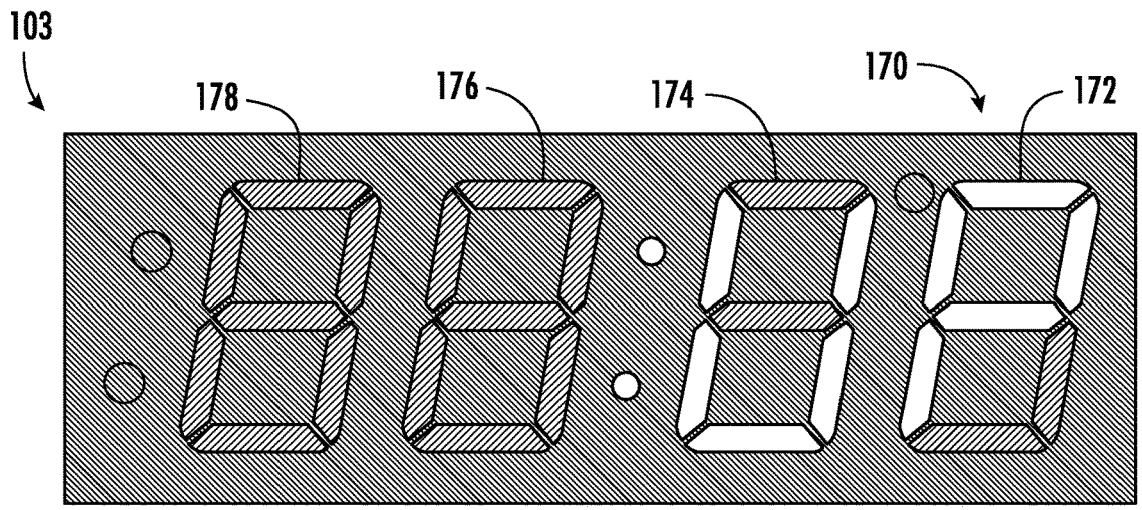
FIG. 2 provides a schematic view of a display of the exemplary oven appliance of FIG. 1.
Figure 3:
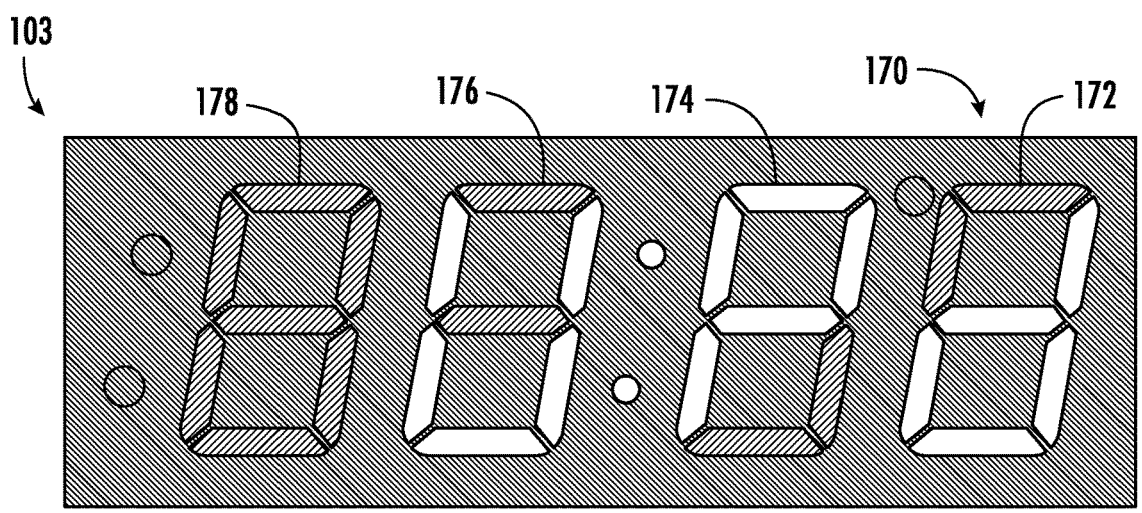
FIG. 3 provides a schematic view of the display of the exemplary oven appliance of FIG. 1.
Figure 4:
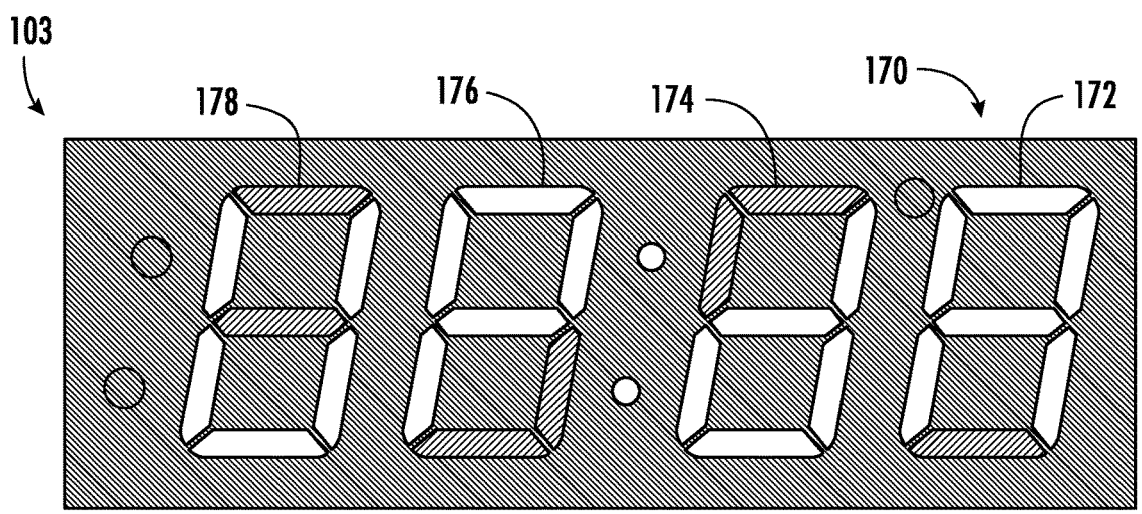
FIG. 4 provides a schematic view of the display of the exemplary oven appliance of FIG. 1.

Accordingly, display 103 may be programmed to present a notification or message to a user of the appliance, e.g., via the plurality of seven-segment displays 170. In detail, the controller may instruct the seven-segment displays 170 to display a predetermined sequence notifying the user as to the available update. FIGS. 2 through 4 present an example of a scrolling message that may be presented to the user. For instance, the plurality of seven-segment displays 170 may include a first seven-segment display 172, a second seven-segment display 174, a third seven-segment display 176, and a fourth seven-segment display 178. According to this embodiment, the first through fourth seven-segment displays 170 may be arranged from right to left.

For at least one example, controller 160 may display to the user a message such as "UPdAtE rEAdY . . . PrESS StArt". Hereinafter, this message may be referred to as a notification sequence or an input command. In the case where only four seven-segment displays 170 are provided within display 130, the message may be scrolled across the plurality of seven-segment displays 170. In detail, controller 160 may begin by forming a "U" on the first seven-segment display 172. As shown in FIG. 2, Controller 160 may then display the "U" on the second seven-segment display 174 and a "P" on the first seven-segment display 172. As shown in FIG. 3, controller 160 may display the "U" on the third seven-segment display 176, the "P" on the second seven-segment display 174, and a "d" on the first seven-segment display 172. As shown in FIG. 4, controller 160 may display the "U" on the fourth seven-segment display 178, the "P" on the third seven-segment display 174, the "d" on the second seven-segment display 174, and an "A" on the first seven-segment display 172. This pattern may be continued such that the words "UPdAtE rEAdY . . . PrESS StArt" are sequentially displayed on the plurality of seven-segment displays 170. According to some embodiments, this message may be continually scrolled across display 103 until an action is taken by the user.

When displaying the message, controller 160 may include a predetermined input command. The predetermined input command may be an instruction for the user to perform in order to acknowledge, receive, or initiate the update. According to the example given above, the input command may be "PrESS StArt". Thus, the user may be notified both that the update (e.g., software update) is available, and what actions to take in order to begin the process of installing the update. According to some embodiments, controller 160 may display several messages including multiple input commands across display 103. For instance, a first input command may be directed toward acknowledging that the update is available. Thus, the second input command may be directed toward when to perform the installation, update, upgrade, or the like.

User interface 102 may further include at least one input device (e.g., controls 112). The input device 112 may be, for example, a number pad (e.g., digits 0 through 9). According to at least some embodiments, the number pad is a plurality of buttons, such that a single button is associated with a number (e.g., from 0 to 9). The number pad may be a touch pad, physical buttons, toggles, switches, or any suitable input device. Thus, the user may interact with user interface 102 in response to the input commands. Additionally or alternatively, user interface 102 may include a start/stop button, a power button, an options button, temperature up and down buttons, time up and down buttons, or the like. Similarly, each of these buttons may be a touch button, a toggle, a switch, or the like.

Figure 5:
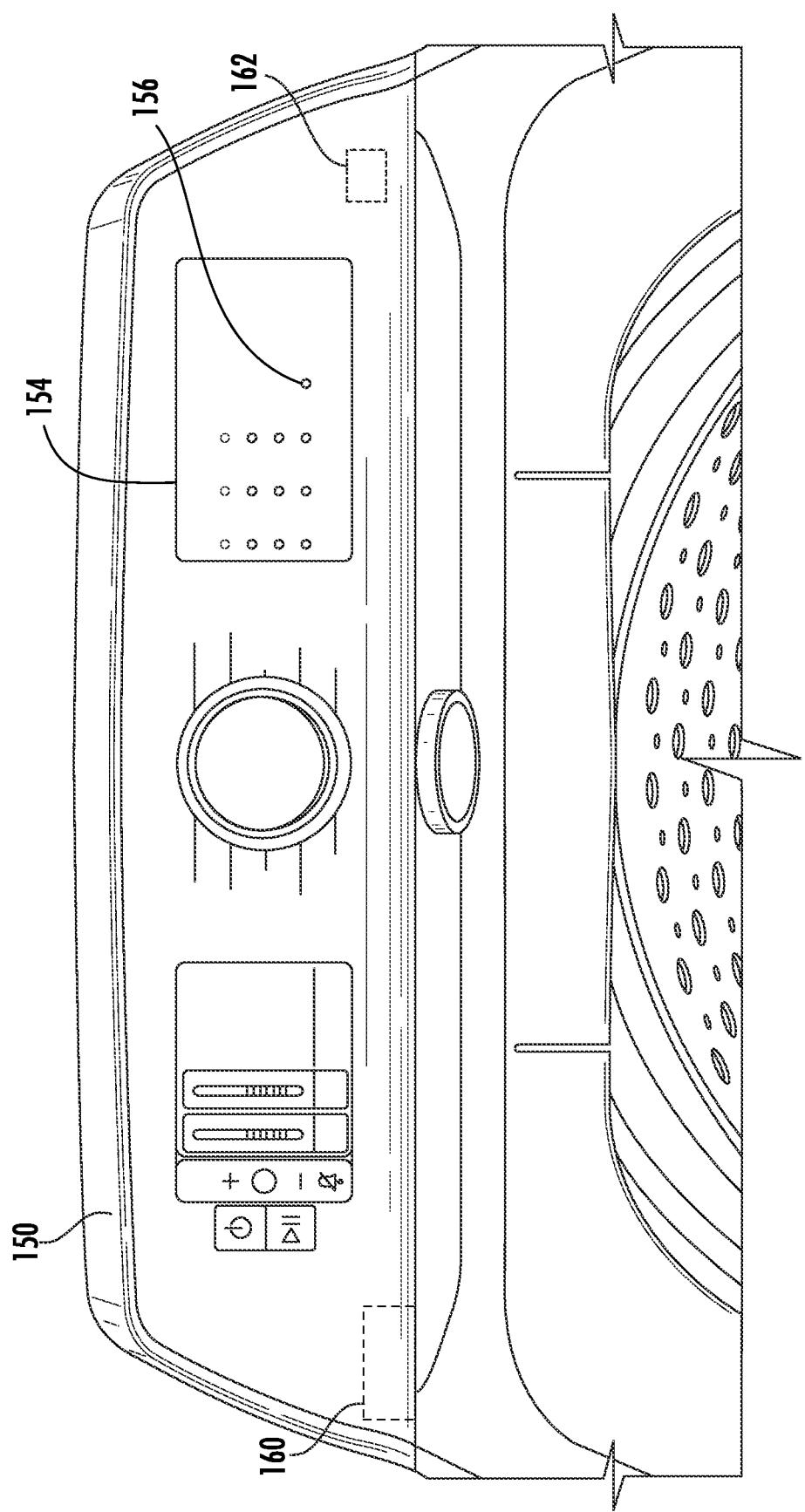
FIG. 5 provides a front perspective view of a laundry treatment appliance according to another exemplary embodiment of the present disclosure.

Referring now to FIG. 5, a home appliance according to another exemplary embodiment of the present disclosure is provided. In detail, a laundry treatment appliance is provided, and specifically, a control panel 150 of a laundry treatment appliance is shown. Control panel 150 may include at least one input selector 152. According to this embodiment, input selector 152 may be a rotary knob capable of clockwise and counter-clockwise rotation. Control panel 150 may further include a display 154. Display 154 may be the same or different from display 103 of oven appliance 100. For instance, display 154 may include a plurality of single light sources (e.g., light emitting diodes (LEDs)) 156. According to some embodiments, each of the plurality of light sources 156 may be associated with an input selection of the laundry treatment appliance. The laundry treatment appliance may also include a controller 160. Controller 160 may be similar to controller 160 of oven appliance 100, and accordingly a detailed description thereof will not be repeated for the sake of brevity.

According to this embodiment, display 154 may not include seven-segment displays 170. Accordingly, controller 160 may provide alerts and notifications to users via at least one of the plurality of light sources 156. Although a plurality of light sources 156 are shown in FIG. 5, it should be understood that the embodiment described herein may be applied to displays including a single light source. Furthermore, the embodiment described herein may apply to displays including other indicators, such as alternative light sources (LEDs, neon lights, incandescent lights, etc.).

Controller 160 may thus instruct the at least one light source 156 to illuminate in response to receiving the signal via the wireless communication module 162. For instance, controller 160 may be programmed with one or more predetermined patterns or sequences, including pulsing patterns, Morse patterns, intensity patterns, brightness patterns, color patterns, or the like. Accordingly, controller 160 may illuminate one or more of the plurality of light sources 156 according to a predetermined sequence. This predetermined pattern may indicate to the user that the update is available. According to some embodiments, the user may then manipulate one or more input devices on control panel 150 to acknowledge, initiate, or decline the update.

It should be understood that some appliances may incorporate one or more of the above-described indication methods or patterns. For instance, some displays on some appliances may include a plurality of seven-segment displays as well as one or more light sources (e.g., LEDs). Accordingly, a controller (e.g., controller 160) may be programmed or configured to perform multiple notification procedures including each display feature. For at least one example, a controller may activate one or more light sources to indicate an available update. The controller may then scroll instructions sequentially through the seven-segment displays. It should be noted that these procedures may also be performed in any suitable order.

Now that the general descriptions of an exemplary appliance have been described in detail, a method 200 of operating an appliance (e.g., oven appliance 100) will be described in detail. Although the discussion below refers to the exemplary method 200 of operating oven appliance 100, one skilled in the art will appreciate that the exemplary method 200 is applicable to any suitable domestic appliance (e.g., such as a washing machine/dryer, a refrigerator, a dishwasher, a microwave, etc.). In exemplary embodiments, the various method steps as disclosed herein may be performed by controller 160 and/or a separate, dedicated controller. FIG. 6 provides a flow chart illustrating a method of operating an appliance. Hereinafter, method 200 will be described with specific reference to FIG. 6.

At step 202, method 200 may include receiving a notification that a software update is available. In detail, an appliance (e.g., oven appliance 100) may wirelessly receive a notification that an update is available, for instance, to update any software present within the appliance. The update may be received through a wireless connection module (e.g., wireless connection module 162). The notification received may include, for example, details regarding the update such as a size, a general description of the update, a length of time to complete the update, and the like. In some instances, the notification may include the update software itself. For instance, the software update may be temporarily stored within a memory of the appliance to await confirmation of installation.

The controller may determine that the appliance is not in use upon receiving the notification. For instance, in the example described above, the controller may determine that the oven appliance is currently in use (e.g., a cooking operation is being performed within the oven appliance). In this case, the display may also be in use, for example, displaying a set temperature of the oven appliance. Accordingly, in order to avoid disruption of the operation and manipulation of the display, the controller may store the notification therein to be displayed at a later time. For instance, the controller may store the notification until the appliance is no longer in use (e.g., the cooking operation has been completed).

At step 204, method 200 may include displaying a predetermined notification sequence via one or more indicators indicating that the software update is available. In detail, the controller of the appliance may provide an indication to a user of the appliance that the update is available. As described above, a display (e.g., display 103) may include a plurality of seven-segment displays arranged side-by-side. Thus, the controller may activate each of the seven-segment displays in a sequential manner to display a message, for instance, in the form of a predetermined sequence. The predetermined notification sequence may include one or more characters including letters, symbols, numbers, or the like. Additionally or alternatively, the predetermined notification sequence may include an input command (i.e., an instruction for a user to input to acknowledge receipt of the notification sequence).

For instance, the predetermined notification sequence may include each of a message notifying a user of an impending update (e.g., "UPdAtE rEAdY") along with an input command (e.g., "PrESS StArt"). It should be noted that the input command may be any suitable command. For instance, according to the example above, the input command may include pressing a start button on the user interface of the appliance. Additional or alternative input commands may be used however, such as a sequence of numbers on a number keypad, a twisting of a knob, a length of time for which to hold down a button, a plurality of keys or buttons to press simultaneously, a toggle switch flip, or the like.

Moreover, the predetermined notification sequence may include a first input command and a second input command. In detail, the predetermined notification sequence may first indicate to the user as to the availability of the update. Accordingly, the controller may then display the first input command (e.g., via the display such as the plurality of seven-segment displays). The first input command may be a command that signals to the controller that the user has acknowledged the notification. Subsequently, the controller may display a second input command on the display. The second input command may include one or more instructions relating to a time to install the update.

For instance, the second input command may include an input sequence to immediately perform the update (e.g., software update). Thus, the predetermined notification sequence may then display "At OnCE . . . PrESS 1 . . . LAtEr . . . PrESS 2", for example. Accordingly, the user may select to have the controller install the update immediately or delay the installation to a later time or date. According to some embodiments, the controller may have a predetermined time or date programmed in for installing potential updates. For instance, the controller may automatically perform updates at a time when the appliance is least likely to be used, such as an early morning hour. According to other embodiments, the date or time for installing updates depends on a size of the update or estimated installation time for the update. Furthermore, it should be noted that the disclosure is not limited to the examples given herein, and that any suitable input may be incorporated as the first input command, the second input command, or both. Additionally or alternatively, as described above, in the case where the appliance is in use upon receiving the notification, the controller may display the predetermined notification sequence when the appliance is no longer in use.

At step 206, method 200 may include receiving a confirmation via a user input via an input device to the user interface to install the system update. In detail, upon displaying the predetermined notification sequence, the controller may await a user input. The user input may include a first confirmation or each of the first confirmation and a second confirmation. The user input may include the first input command, the second input command, or both. For instance, the predetermined notification sequence may include displaying the first input command. The controller may then wait for the first confirmation to be input by the user. The controller may then display the second input command and await the input of the second confirmation.

As described above, the first confirmation may include an acknowledgement of the availability of the update. The first confirmation may prompt the controller to display the second input command for the second confirmation. For instance, the second confirmation may include an instruction to the controller to install the update immediately or to install the update at a later time. For instance, the second input command may include a first sequence associated with an immediate start to the update and a second sequence associated with a delayed start to the update. Accordingly, the controller may adjust actions based on the second confirmation.

At step 208, method 200 may include instructing the wireless communication module to obtain the system update. In detail, upon receiving the confirmation (e.g., the first confirmation, the second confirmation, or both), the controller may initiate a download of the system or software update. The wireless module may thus establish a connection with a remote server, such as a manufacturers server, and begin a download of the update. Further, according to some embodiments, the controller may initiate a full installation of the update. For instance, the controller may receive the second confirmation to perform the update immediately. Accordingly, the controller, upon completing the download of the update, may immediately install the update.

According to other embodiments, the controller may institute a delay between obtaining the update and initiating the installation of the update. For instance, upon receiving the second confirmation to delay the installation, the controller may return the user interface (e.g., the display and input devices) to standard operating procedure. The update may then begin according to a predetermined schedule. Additionally or alternatively, the user may select a date and time to perform the installation of the update.

According to the embodiments described herein, a home appliance having a limited display may incorporate alternative methods for indicating the availability of a software update to the appliance. The limited display may include one or more indicators, such as light sources. The indicators may be arranged as a plurality of seven-segment displays. The controller may selectively manipulate the indicators to display a predetermined notification sequence on the display. The predetermined notification sequence may include one or more characters, such as letters, numbers, or symbols. The predetermined notification sequence may further implement an operational sequence of the indicators, such as a pulsing of a light source, a color of a light source, or the like. Upon receiving a notification that a software update is available, the controller may display the predetermined notification sequence, which may include one or more input commands. The one or more input commands may be manipulations that a user may perform on the user interface to acknowledge the notification. Upon receiving the one or more confirmations, the controller may obtain (e.g., download) the update and begin an installation procedure. Advantageously, software updates to home appliances may be more effectively delivered to and noticed by users of the appliances, resulting in a higher rate of installation of the updates.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A home appliance, comprising:
   a cabinet;
   a user interface provided on the cabinet, the user interface comprising a limited display comprising one or more indicators and at least one input device;
   a wireless communication module configured to receive wireless transmissions; and
   a controller provided within the cabinet and operably coupled with the user interface and the wireless communication module, the controller comprising one or more processing devices operable to execute programming instructions and being configured for:
      receiving a notification that a software update for the home appliance is available via the wireless communication module;
      displaying a predetermined notification sequence by illuminating at least one of the one or more indicators according to a predetermined pattern indicating that the software update is available in response to receiving the notification;
      receiving a confirmation via a user input to the at least one input device to install the software update after displaying the predetermined notification; and
      instructing the wireless communication module to obtain the software update in response to receiving the confirmation.

2. The home appliance of claim 1, wherein the one or more indicators are arranged into a plurality of seven-segment displays.

3. The home appliance of claim 2, wherein the predetermined notification sequence comprises displaying one or more characters sequentially across the plurality of seven-segment displays.

4. The home appliance of claim 3, wherein the one or more characters comprises an input command for the at least one input device.

5. The home appliance of claim 4, wherein the input command comprises a first input command and a second input command and the confirmation comprises a first confirmation and a second confirmation.

6. The home appliance of claim 5, wherein the controller is further configured for:
   displaying the first input command on the user interface; and
   receiving the first confirmation via the at least one input device, the first confirmation comprising the first input command.

7. The home appliance of claim 6, wherein the controller is further configured for:
   displaying the second input command in response to receiving the first confirmation; and
   receiving the second confirmation via the at least one input device, the second confirmation comprising the second input command.

8. The home appliance of claim 5, wherein the second confirmation comprises an instruction to install the software update immediately.

9. The home appliance of claim 1, wherein the controller is further configured for:
   determining that the home appliance is not in use in response to receiving the notification of the software update; and
   displaying the predetermined notification sequence on the user interface in response to determining that the home appliance is not in use.

10. The home appliance of claim 1, wherein the one or more indicators comprises a single light emitting diode, and wherein the displaying the predetermined notification sequence on the user interface via the one or more indicators comprises:
    activating the single light emitting diode according to a predetermined sequence.

11. A method of operating a home appliance, the home appliance comprising a cabinet, a user interface provided on the cabinet, the user interface comprising a limited display comprising one or more indicators and at least one input device, and a wireless communication module configured to receive wireless transmissions, the method comprising:
    receiving a notification that a software update for the home appliance is available via the wireless communication module;
    displaying a predetermined notification sequence by illuminating at least one of the one or more indicators according to a predetermined pattern indicating that the software update is available in response to receiving the notification;
    receiving a confirmation via a user input to the input device to install the software update after displaying the predetermined notification; and
    instructing the wireless communication module to obtain the software update in response to receiving the confirmation.

12. The method of claim 11, wherein the one or more indicators are arranged into a plurality of seven-segment displays.

13. The method of claim 12, wherein the predetermined notification sequence comprises displaying one or more characters sequentially across the plurality of seven-segment displays.

14. The method of claim 13, wherein the one or more characters comprises an input command for the at least one input device.

15. The method of claim 14, wherein the input command comprises a first input command and a second input command and the confirmation comprises a first confirmation and a second confirmation.

16. The method of claim 15, further comprising:
    displaying the first input command on the user interface; and
    receiving the first confirmation via the at least one input device, the first confirmation comprising the first input command.

17. The method of claim 16, further comprising:
    displaying the second input command in response to receiving the first confirmation; and
    receiving the second confirmation via the at least one input device, the second confirmation comprising the second input command.

18. The method of claim 15, wherein the second confirmation comprises an instruction to install the software update immediately.

19. The method of claim 11, further comprising:
  determining that the home appliance is not in use in response to receiving the notification of the software update; and
  displaying the predetermined notification sequence on the user interface in response to determining that the home appliance is not in use.

20. The method of claim 11, wherein the one or more indicators comprises a single light emitting diode, and wherein the displaying the predetermined notification sequence on the user interface via the one or more indicators comprises:
  activating the single light emitting diode according to a predetermined sequence.

\* \* \* \* \*